US012782191B2

(12) United States Patent
Otera et al.

(10) Patent No.: US 12,782,191 B2
(45) Date of Patent: Nov. 3, 2026

(54) VIBRATION DEVICE AND ELECTRONIC DEVICE

(71) Applicant: Murata Manufacturing Co., Ltd., Nagaokakyo (JP)

(72) Inventors: Shozo Otera, Nagaokakyo (JP); Yutaka Ishiura, Nagaokakyo (JP); Jun Endo, Nagaokakyo (JP); Michio Wada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 218 days.

(21) Appl. No.: 18/810,850

(22) Filed: Aug. 21, 2024

(65) Prior Publication Data

US 2024/0410744 A1 Dec. 12, 2024

Related U.S. Application Data

(63) Continuation of application No. PCT/JP2023/005929, filed on Feb. 20, 2023.

(30) Foreign Application Priority Data

Feb. 22, 2022 (JP) ................................ 2022-025583
May 25, 2022 (JP) ................................ 2022-084944

(51) Int. Cl.
*G01H 11/08* (2006.01)

(52) U.S. Cl.
CPC .................................... *G01H 11/08* (2013.01)

(58) Field of Classification Search
None
See application file for complete search history.

(56) References Cited

U.S. PATENT DOCUMENTS 11,455,038 B2 9/2022 Hashimoto et al.
11,556,177 B2 1/2023 Tominaga et al.
(Continued)

FOREIGN PATENT DOCUMENTS

WO 2012/114761 A1 8/2012
WO 2019/013164 A1 1/2019
(Continued)

OTHER PUBLICATIONS

International Search Report received for PCT Patent Application No. PCT/JP2023/005929, mailed on Apr. 18, 2023, 2 pages (English Translation Only).

*Primary Examiner* — Suman K Nath
(74) *Attorney, Agent, or Firm* — ArentFox Schiff LLP

(57) ABSTRACT

A vibration device that includes a support member, an actuator, and a sensor that detects a force applied to a vibrated member and displacement of the vibrated member in a left-right direction. The support member includes a fixing portion, a vibration portion, and an elastically deformable portion connecting the fixing portion and the vibration portion. The actuator is attached to the fixing portion and the vibration portion. The sensor is attached to the elastically deformable portion. The elastically deformable portion has a first elastic modulus in the left-right direction, a second elastic modulus in a front-rear direction, and a third elastic modulus in an up-down direction. The first elastic modulus is smaller than the second elastic modulus. The third elastic modulus is smaller than the second elastic modulus.

20 Claims, 14 Drawing Sheets

(56) References Cited

U.S. PATENT DOCUMENTS

| | | | |
|---|---|---|---|
| 11,948,449 | B2 | 4/2024 | Endo et al. |
| 2013/0328820 | A1 | 12/2013 | Kondoh et al. |
| 2019/0155391 | A1 | 5/2019 | Hashimoto et al. |
| 2021/0240272 | A1 | 8/2021 | Tominaga et al. |
| 2021/0387231 | A1* | 12/2021 | Sato ........................ B06B 1/045 |
| 2022/0324697 | A1* | 10/2022 | Toshiyoshi ............ B81B 3/0021 |
| 2022/0343742 | A1* | 10/2022 | Endo ........................ G08B 6/00 |

FOREIGN PATENT DOCUMENTS

| | | | |
|---|---|---|---|
| WO | 2020/213477 | A1 | 10/2020 |
| WO | 2021/261470 | A1 | 12/2021 |

* cited by examiner

VIBRATION DEVICE AND ELECTRONIC DEVICE

CROSS REFERENCE TO RELATED APPLICATIONS

The present application is a continuation of International application No. PCT/JP2023/005929, filed Feb. 20, 2023, which claims priority to Japanese Patent Application No. 2022-025583, filed Feb. 22, 2022, and Japanese Patent Application No. 2022-084944, filed May 25, 2022, the entire contents of each of which are incorporated herein by reference.

TECHNICAL FIELD

The present disclosure relates to a vibration device and an electronic device including the vibration device.

BACKGROUND ART

As an example of a conventional vibration device, a vibration device described in Patent Document 1 is known. The vibration device described in Patent Document 1 is used in an electronic device including an electronic device body and an operation target with which a part of a user's body comes into contact for operating the electronic device.

Patent Document 1: WO 2021/261470 A

SUMMARY OF THE DISCLOSURE

In the vibration device described in Patent Document 1, there is a demand for detecting a force applied to the operation target and detecting displacement of the operation target in a direction orthogonal to a direction of the force applied to the operation target without attaching a sensor to the operation target.

Therefore, an object of the present disclosure is to provide a vibration device capable of detecting a force applied to the operation target and detecting displacement of the operation target in a direction orthogonal to a direction of the force applied to the operation target without attaching a sensor to the operation target, and an electronic device.

A vibration device according to an embodiment of the present disclosure includes: a support member that includes: a fixing portion fixed to a fixing member, a vibration portion supporting a vibrated member, and an elastically deformable portion connecting the fixing portion and the vibration portion; an actuator constructed to vibrate a vibrated member in a left-right direction, the actuator being attached to the fixing portion or the fixing member and the vibration portion or the vibrated member; and a sensor constructed to detect a force applied to the vibrated member and displacement of the vibrated member in the left-right direction, the sensor being attached to the elastically deformable portion, wherein the elastically deformable portion has a first elastic modulus in the left-right direction, a second elastic modulus in a front-rear direction, and a third elastic modulus in a up-down direction, the first elastic modulus is smaller than the second elastic modulus, and the third elastic modulus is smaller than the second elastic modulus.

In the present specification, directions are defined as follows. A direction in which an upper principal surface US3 and a lower principal surface LS3 of a support member 3 are arranged is defined as an up-down direction. A direction in which the long sides of the upper principal surface US3 of the support member 3 extend, as viewed in the up-down direction, is defined as a left-right direction. A direction in which the short sides of the upper principal surface US3 of the support member 3 extend, as viewed in the up-down direction, is defined as a front-rear direction. The up-down direction, the left-right direction, and the front-rear direction are orthogonal to each other. Note that the definition of directions in the present description is an example. Therefore, a direction at the time of actual use of a vibration device 10 does not need to coincide with a direction in the present description. The up-down direction may be reversed in FIGS. 1 to 14. The left-right direction may be reversed in FIGS. 1 to 14. The front-rear direction may be reversed in FIGS. 1 to 14.

Hereinafter, X and Y represent components or members of an electronic device 100. In the present specification, each part of X is defined as follows unless otherwise specified. An upper part of X means the upper half of X. An upper end of X means the end of X in the upward direction. An upper end portion of X means the upper end of X and the vicinity thereof. This definition also applies to directions other than the upward direction.

In addition, "X is located on Y" means that X is located directly above Y. Therefore, X overlaps Y as viewed in the up-down direction. "X is located above Y" means that X is located directly above Y and that X is located diagonally above Y. Therefore, X may or may not overlap Y as viewed in the up-down direction. This definition also applies to directions other than the upward direction.

In the present specification, "X and Y are electrically connected" means that electricity is conducted between X and Y. Therefore, X and Y may be in contact with each other, or X and Y may not be in contact with each other. When X and Y are not in contact with each other, Z having conductivity is disposed between X and Y.

According to the vibration device of the present disclosure, it is possible to detect a force applied to the operation target and to detect displacement of the operation target in a direction orthogonal to a direction of the force applied to the operation target without attaching a sensor to the operation target.

DESCRIPTION OF THE PREFERRED EMBODIMENTS

First Embodiment

Figure 1:
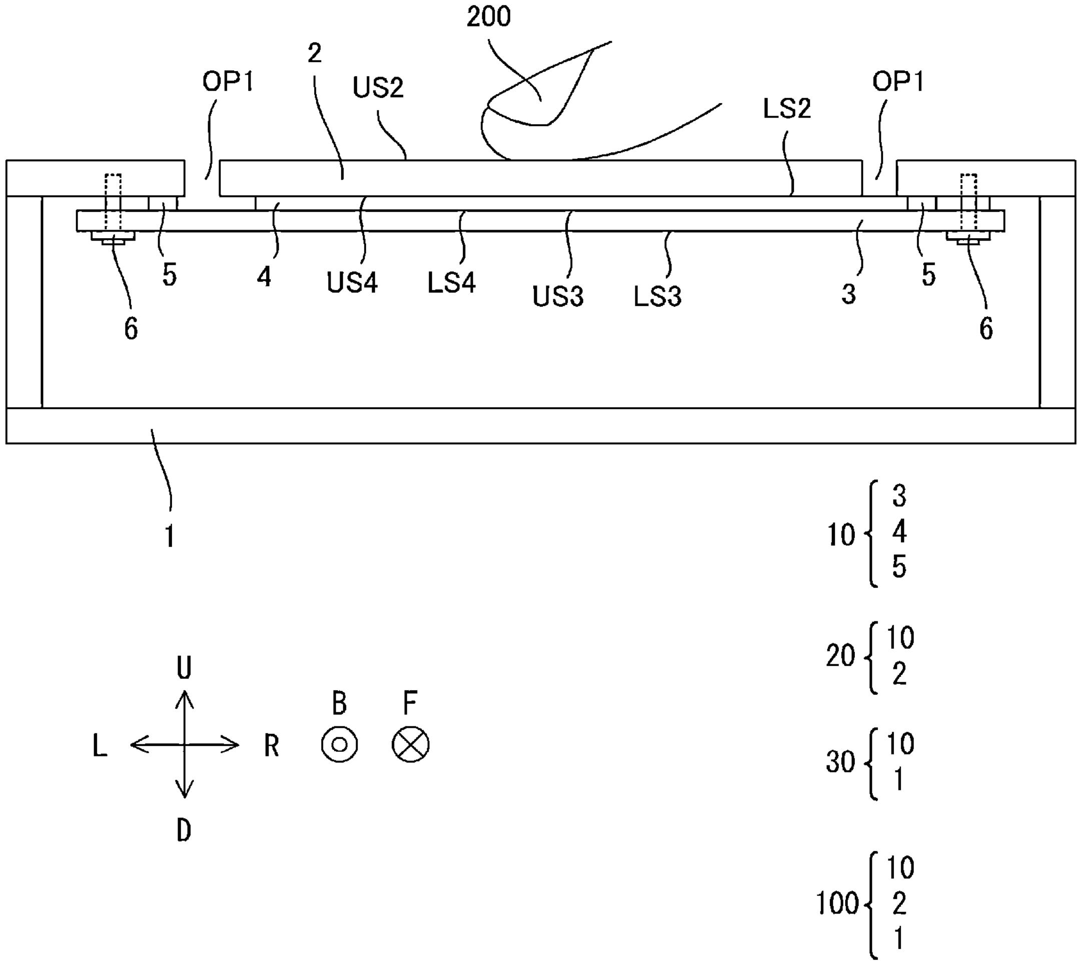
FIG. 1 is a sectional view of an electronic device 100 according to a first embodiment as view in a front direction.
Figure 2:
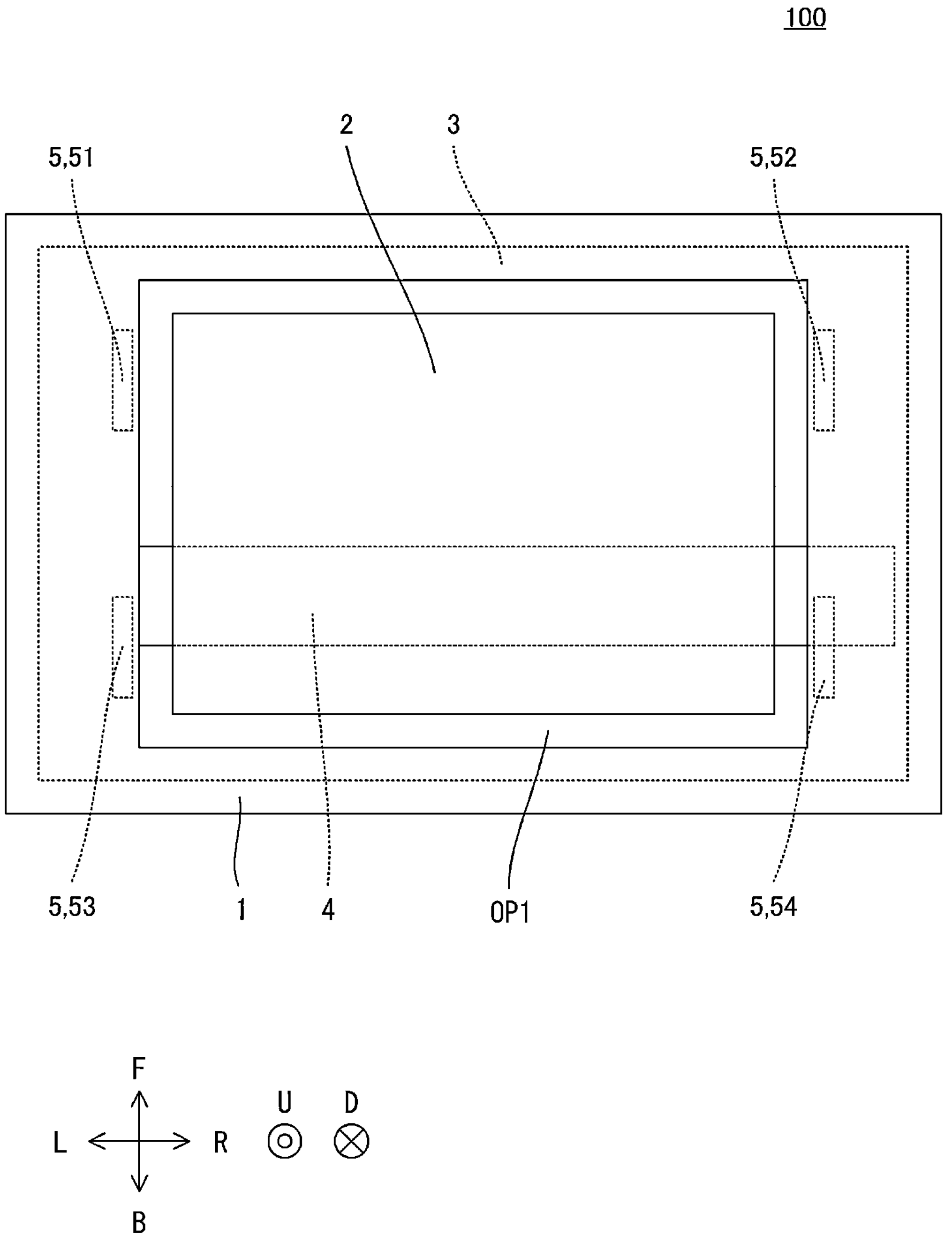
FIG. 2 is a plan view of the electronic device 100 according to the first embodiment as viewed in a downward direction.
Figure 3:
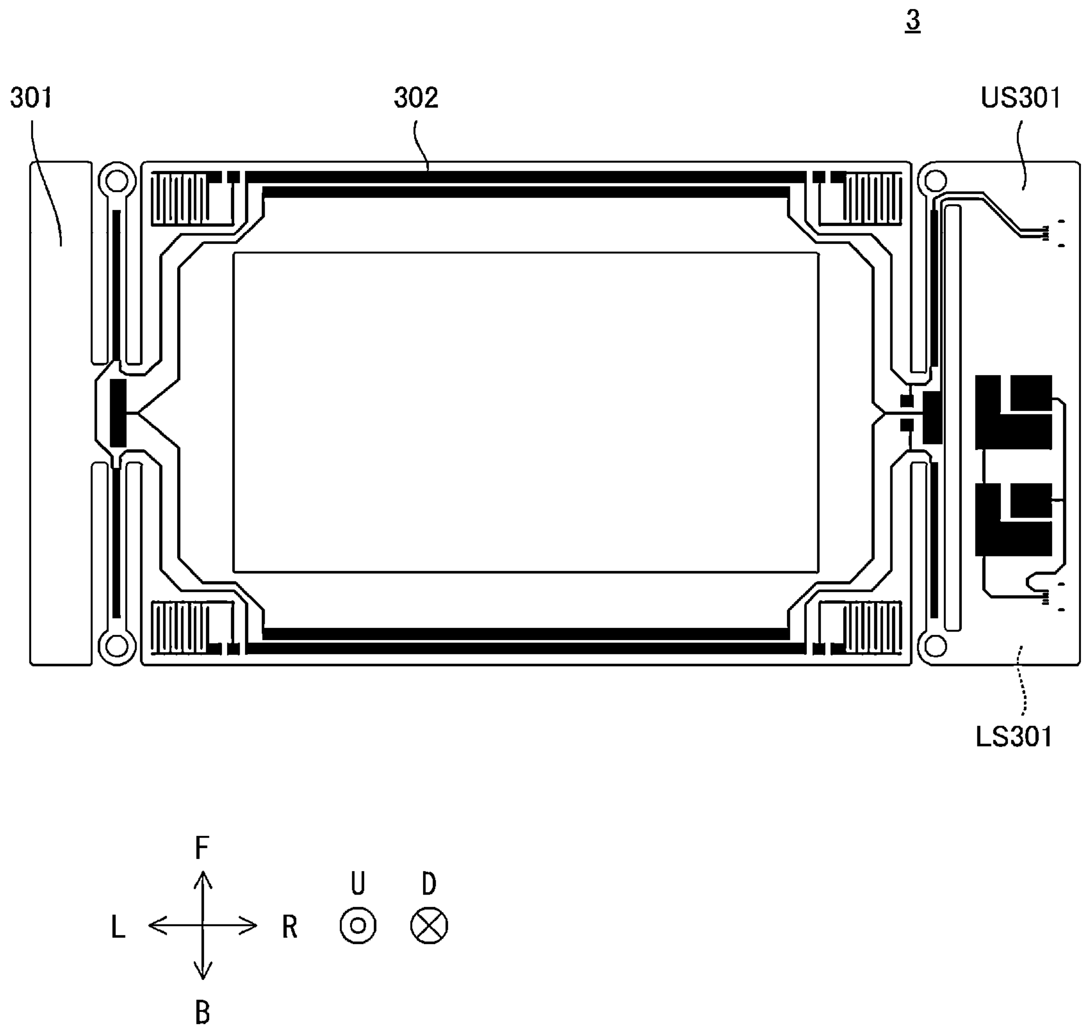
FIG. 3 is a plan view of a support member 3 according to the first embodiment as viewed in the downward direction.
Figure 4:
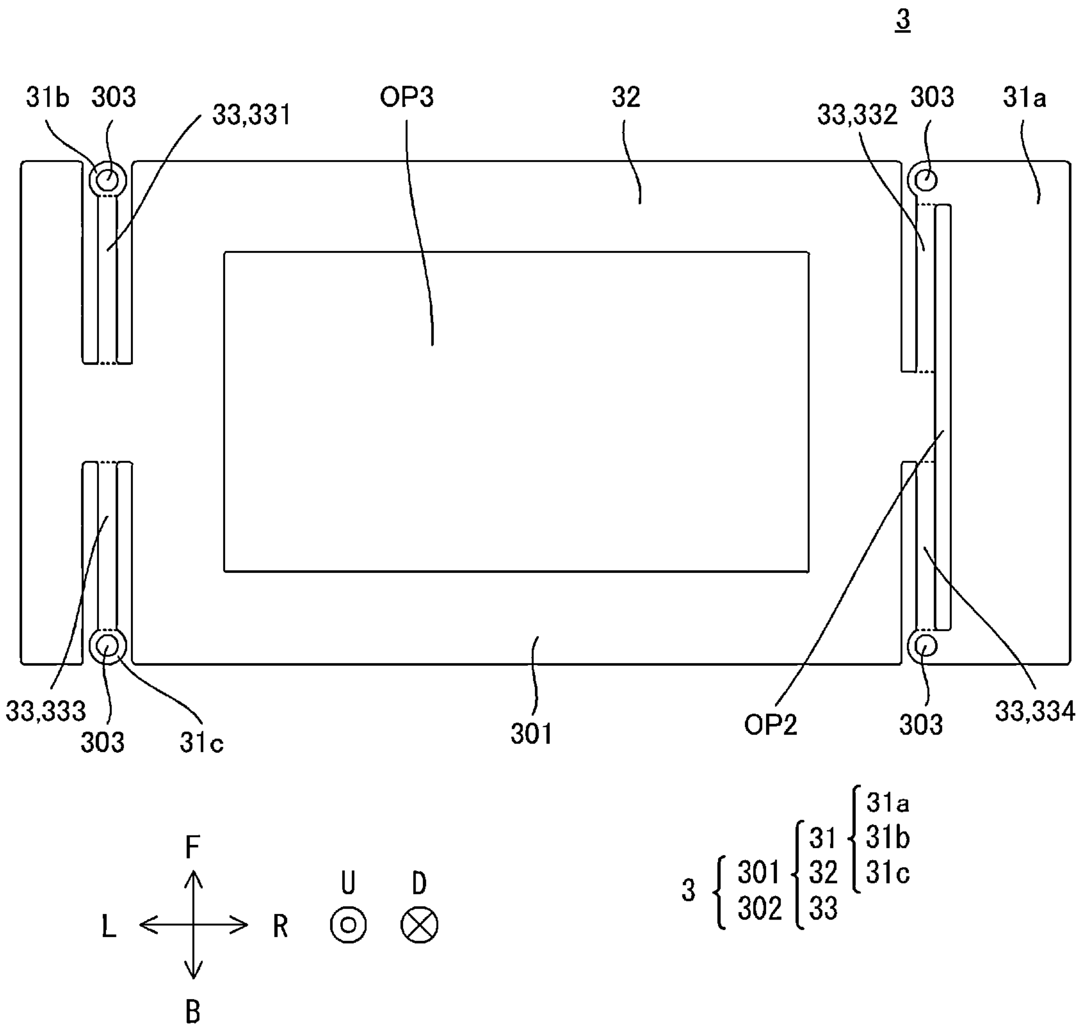
FIG. 4 is a plan view of the support member 3 according to the first embodiment as viewed in the downward direction.
Figure 5:
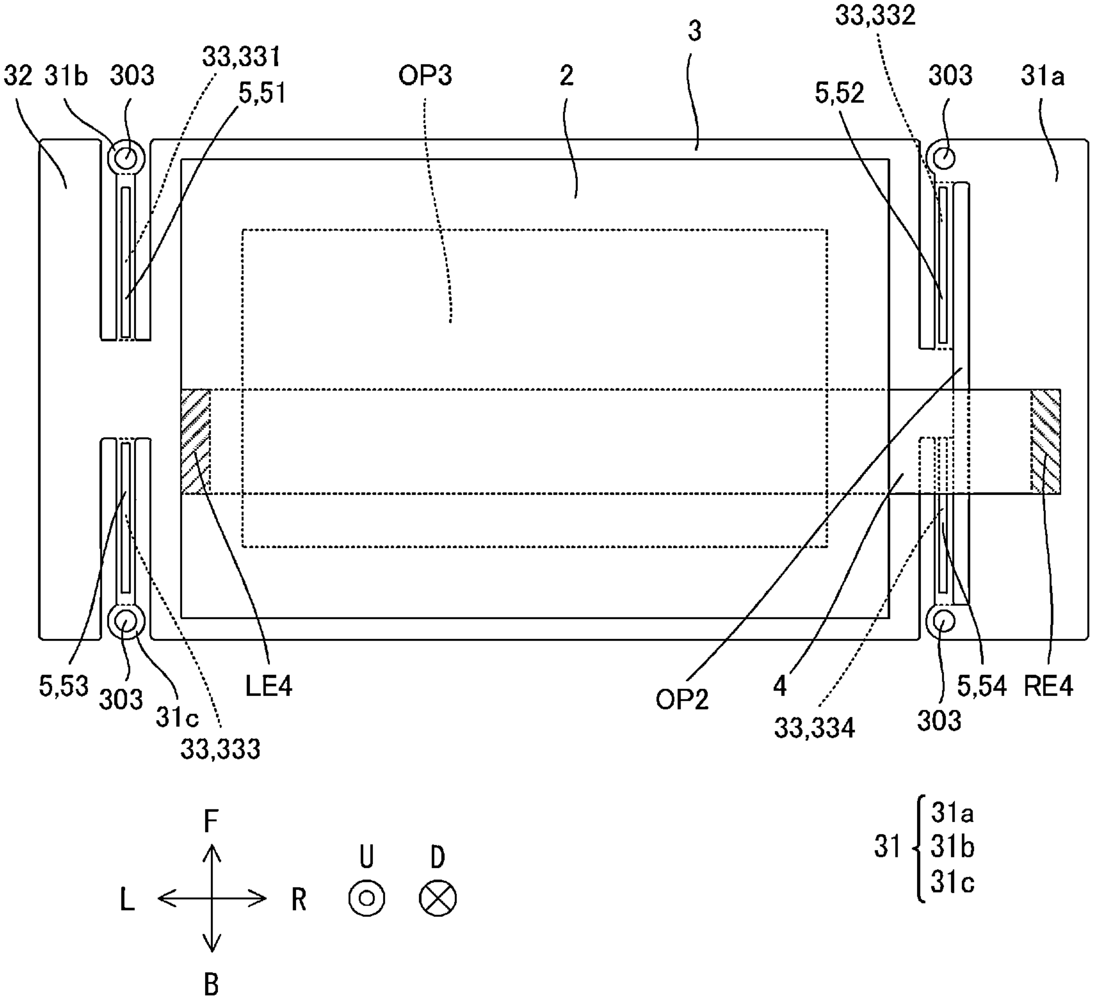
FIG. 5 is a plan view of a vibrated member 2, the support member 3, an actuator 4, and a sensor 5 according to the first embodiment as viewed in the downward direction.
Figure 6:
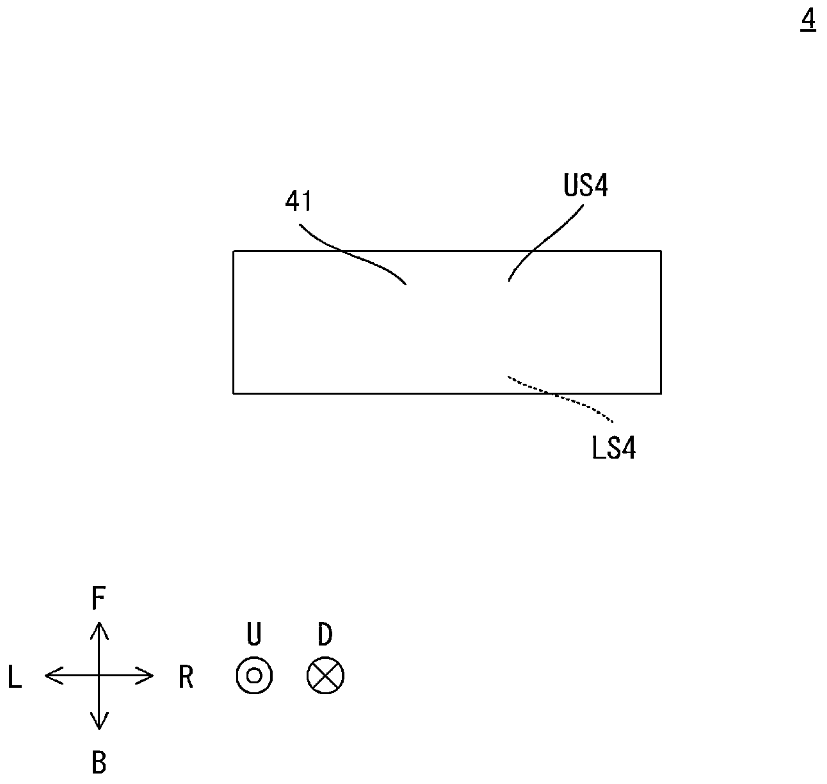
FIG. 6 is a plan view of the actuator 4 according to the first embodiment as viewed in the downward direction.
Figure 7:
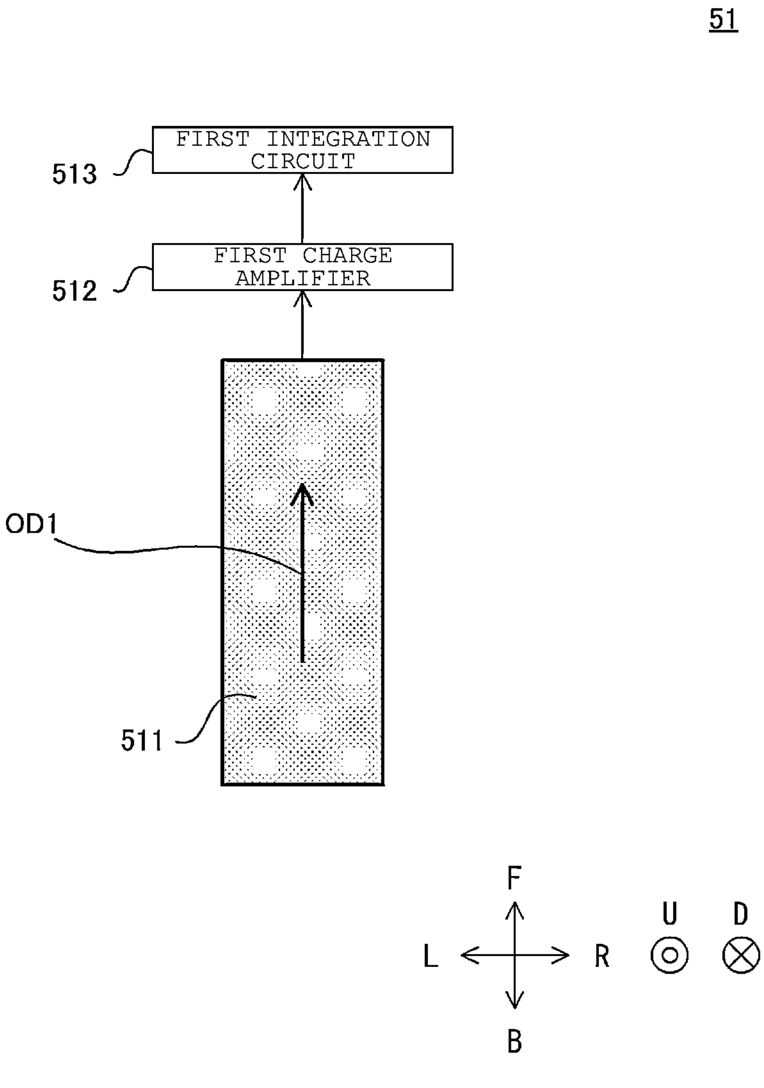
FIG. 7 is a plan view of a first sensor portion 51 according to the first embodiment.
Figure 8:
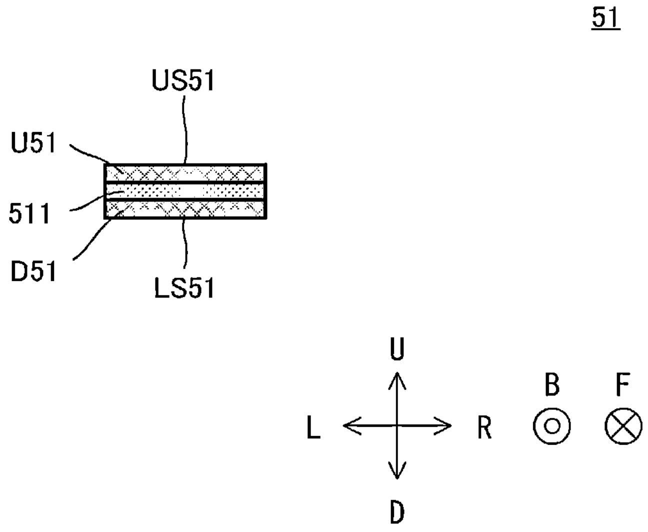
FIG. 8 is a sectional view of the first sensor portion 51 according to the first embodiment.
Figure 9:
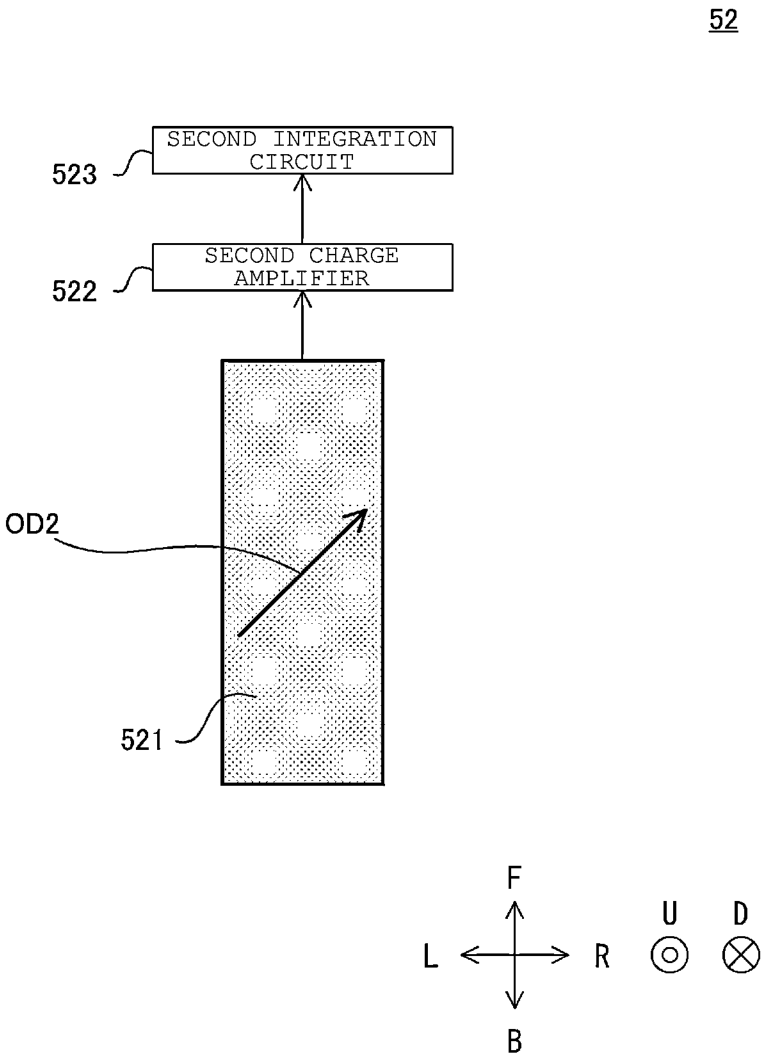
FIG. 9 is a plan view of a second sensor portion 52 according to the first embodiment.
Figure 10:
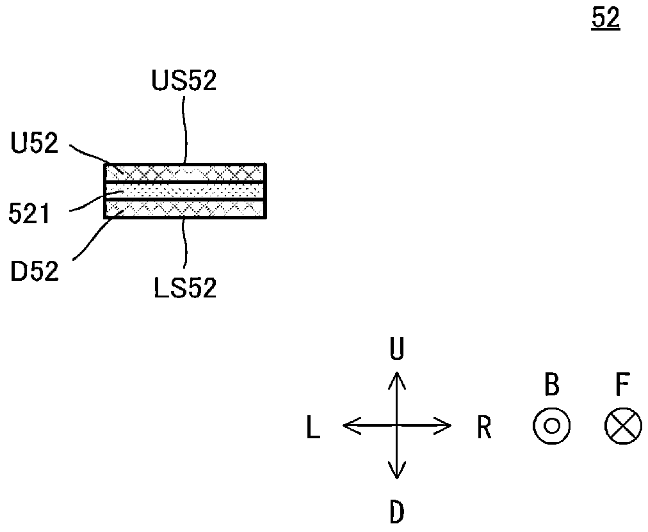
FIG. 10 is a sectional view of the second sensor portion 52 according to the first embodiment.

Hereinafter, a configuration of a vibration device 10 according to a first embodiment of the present disclosure will be described with reference to the drawings. FIG. 1 is a sectional view of an electronic device 100 according to a first embodiment as view in a front direction. FIG. 2 is a plan view of the electronic device 100 according to the first embodiment as viewed in a downward direction. FIG. 3 is a plan view of a support member 3 according to the first embodiment as viewed in the downward direction. Note that, in FIG. 3, only a representative conductor pattern 302 among a plurality of conductor patterns 302 is denoted by a reference numeral. FIG. 4 is a plan view of the support member 3 according to the first embodiment as viewed in the downward direction. Note that, in FIG. 4, the plurality of conductor patterns 302 are omitted. FIG. 5 is a plan view of a vibrated member 2, a support member 3, an actuator 4, and a sensor 5 according to the first embodiment as viewed in the downward direction. Note that, in FIG. 5, the plurality of conductor patterns 302 are omitted. FIG. 6 is a plan view of the actuator 4 according to the first embodiment as viewed in the downward direction. FIG. 7 is a plan view of a first sensor portion 51 according to the first embodiment. FIG. 8 is a sectional view of the first sensor portion 51 according to the first embodiment. FIG. 9 is a plan view of a second sensor portion 52 according to the first embodiment. FIG. 10 is a sectional view of the second sensor portion 52 according to the first embodiment.

As illustrated in FIG. 1, as an example, the vibration device 10 is used in the electronic device 100 that gives tactile feedback to a user 200 by vibrating the vibrated member 2 in a left-right direction when the user 200 presses the vibrated member 2. The vibrated member 2 vibrates when the user 200 presses the vibrated member 2, enabling the user 200 to feel the press of the vibrated member 2. As described above, the vibration device 10 is attached to a device including a housing 1 and the vibrated member 2 vibrating in the left-right direction with respect to the housing 1. The housing 1 corresponds to a "fixing member" of the present disclosure. The user 200 applies a force to the vibrated member 2 in the downward direction.

The housing 1 is a rectangular parallelepiped box. As illustrated in FIG. 1, the housing 1 is provided with a first opening OP1. More specifically, as illustrated in FIG. 2, the first opening OP1 has a rectangular shape as viewed in the up-down direction. As illustrated in FIG. 1, the first opening OP1 penetrates an upper surface of the housing 1 in the up-down direction.

As illustrated in FIG. 1, the vibrated member 2 has a plate shape. Therefore, the vibrated member 2 has an upper principal surface US2 and a lower principal surface LS2 arranged in the up-down direction. The upper principal surface US2 is located above the lower principal surface LS2. The upper principal surface US2 and the lower principal surface LS2 are parallel to each other. As illustrated in FIG. 2, each of the upper principal surface US2 and the lower principal surface LS2 has a rectangular shape having a long side extending in the left-right direction and a short side extending in the front-rear direction.

As illustrated in FIG. 1, the position of the vibrated member 2 in the up-down direction is equal to the position of the upper surface of the housing 1 in the up-down direction. The vibrated member 2 is located in the first opening OP1 as viewed in the up-down direction. Accordingly, the user 200 can press the upper principal surface US2 of the vibrated member 2. Note that the vibrated member 2 is not in contact with the housing 1.

As illustrated in FIG. 1, the vibration device 10 includes a support member 3, an actuator 4, and a sensor 5. As illustrated in FIG. 3, the support member 3 includes a substrate 301 and a plurality of conductor patterns 302. The material of the substrate 301 is, for example, glass epoxy. Glass epoxy is formed by impregnating glass fiber with an epoxy resin and subjecting the glass fiber to a thermal curing treatment.

As illustrated in FIG. 3, the substrate 301 has a plate shape. Therefore, the substrate 301 has an upper principal surface US301 and a lower principal surface LS301 arranged in the up-down direction. The upper principal surface US301 is located above the lower principal surface LS301. The upper principal surface US301 and the lower principal surface LS301 are parallel to each other. Each of the upper principal surface US301 and the lower principal surface LS301 has a rectangular shape having a long side extending in the left-right direction and a short side extending in the front-rear direction.

As illustrated in FIG. 3, the substrate 301 is provided with the plurality of conductor patterns 302. The plurality of conductor patterns 302 are formed, for example, by patterning a copper foil attached to the substrate 301 by photolithography or the like.

As illustrated in FIG. 4, the support member 3 includes a fixing portion 31, a vibration portion 32, and a plurality of elastically deformable portions 33. More specifically, the substrate 301 has the fixing portion 31, the vibration portion 32, and the plurality of elastically deformable portions 33.

As illustrated in FIG. 1, the fixing portion 31 is fixed to the housing 1. More specifically, as illustrated in FIG. 4, the fixing portion 31 has a first fixing portion 31*a*, a second fixing portion 31*b*, and a third fixing portion 31*c*. Each of the first fixing portion 31*a*, the second fixing portion 31*b*, and the third fixing portion 31*c* has a screw hole 303. Each of the first fixing portion 31*a*, the second fixing portion 31*b*, and the third fixing portion 31*c* is fixed to the housing 1 by inserting a bolt 6 into each of the screw hole 303 and a screw hole (not illustrated) of the housing 1 from below the screw hole 303.

As illustrated in FIG. 4, the first fixing portion 31*a* is located on the right of the vibration portion 32 as viewed in the up-down direction. The second fixing portion 31*b* is located on the left of the left front corner of the vibration portion 32 as viewed in the up-down direction. The third fixing portion 31*c* is located on the left of the left rear corner of the vibration portion 32 as viewed in the up-down direction.

As illustrated in FIG. 4, the first fixing portion 31*a* is provided with a second opening OP2. More specifically, the second opening OP2 has a rectangular shape as viewed in the up-down direction. The second opening OP2 penetrates the first fixing portion 31*a* in the up-down direction.

As illustrated in FIG. 4, the vibration portion 32 is provided with a third opening OP3. More specifically, the third opening OP3 has a rectangular shape as viewed in the up-down direction. The third opening OP3 penetrates the vibration portion 32 in the up-down direction.

As illustrated in FIG. 5, the vibrated member 2 is provided on an upper surface of the vibration portion 32. Therefore, the vibration portion 32 supports the vibrated member 2.

The elastically deformable portion 33 elastically deforms. That is, the elastically deformable portion 33 has a first elastic modulus in the left-right direction. The elastically deformable portion 33 has a second elastic modulus in the front-rear direction. The elastically deformable portion 33 has a third elastic modulus in the up-down direction. In the present embodiment, the elastically deformable portion 33 includes a first elastically deformable portion 331, a second elastically deformable portion 332, a third elastically deformable portion 333, and a fourth elastically deformable portion 334. Each of the first elastically deformable portion 331, the second elastically deformable portion 332, the third elastically deformable portion 333, and the fourth elastically deformable portion 334 elastically deforms. That is, each of the first elastically deformable portion 331, the second elastically deformable portion 332, the third elastically deformable portion 333, and the fourth elastically deformable portion 334 has a first elastic modulus in the left-right direction. Each of the first elastically deformable portion 331, the second elastically deformable portion 332, the third elastically deformable portion 333, and the fourth elastically deformable portion 334 has a second elastic modulus in the front-rear direction. Each of the first elastically deformable portion 331, the second elastically deformable portion 332, the third elastically deformable portion 333, and the fourth elastically deformable portion 334 has a third elastic modulus in the up-down direction.

As illustrated in FIG. 4, the elastically deformable portion 33 connects the fixing portion 31 of the support member 3 and the vibration portion 32 of the support member 3. More specifically, the first elastically deformable portion 331 is located on the left of the vibration portion 32. The first elastically deformable portion 331 viewed in the up-down direction overlaps a front portion of the vibration portion 32 of the support member 3 viewed in the up-down direction as viewed in the left-right direction. The first elastically deformable portion 331 connects the second fixing portion 31*b* and the vibration portion 32.

As illustrated in FIG. 4, the second elastically deformable portion 332 is located on the right of the vibration portion 32. The second elastically deformable portion 332 viewed in the up-down direction overlaps the front portion of the vibration portion 32 of the support member 3 viewed in the up-down direction as viewed in the left-right direction. The second elastically deformable portion 332 connects the first fixing portion 31*a* and the vibration portion 32.

As illustrated in FIG. 4, the third elastically deformable portion 333 is located on the left of the vibration portion 32. The third elastically deformable portion 333 viewed in the up-down direction overlaps a rear portion of the vibration portion 32 of the support member 3 viewed in the up-down direction as viewed in the left-right direction. The third elastically deformable portion 333 connects the third fixing portion 31*c* and the vibration portion 32.

As illustrated in FIG. 4, the fourth elastically deformable portion 334 is located on the right of the vibration portion 32. The fourth elastically deformable portion 334 viewed in the up-down direction overlaps the rear portion of the vibration portion 32 of the support member 3 viewed in the up-down direction as viewed in the left-right direction. The fourth elastically deformable portion 334 connects the first fixing portion 31*a* and the vibration portion 32.

As illustrated in FIG. 4, the length of the elastically deformable portion 33 in the left-right direction is shorter than the length of the elastically deformable portion 33 in the front-rear direction. More specifically, the length of the first elastically deformable portion 331 in the left-right direction is shorter than the length of the elastically deformable portion 33 in the front-rear direction. The same applies to the second elastically deformable portion 332, the third elastically deformable portion 333, and the fourth elastically deformable portion 334. Accordingly, the first elastic modulus of the elastically deformable portion 33 is smaller than the second elastic modulus of the elastically deformable portion 33. More specifically, the first elastic modulus of each of the first elastically deformable portion 331, the second elastically deformable portion 332, the third elastically deformable portion 333, and the fourth elastically deformable portion 334 is smaller than the second elastic modulus of each of the first elastically deformable portion 331, the second elastically deformable portion 332, the third elastically deformable portion 333, and the fourth elastically deformable portion 334. That is, the elastically deformable portion 33 is more likely to elastically deform in the left-right direction than in the front-rear direction. More specifically, each of the first elastically deformable portion 331, the second elastically deformable portion 332, the third elastically deformable portion 333, and the fourth elastically deformable portion 334 is more likely to elastically deform in the left-right direction than in the front-rear direction.

The length of the elastically deformable portion 33 in the up-down direction is shorter than the length of the elastically deformable portion 33 in the front-rear direction. More specifically, the length of the first elastically deformable portion 331 in the up-down direction is shorter than the length of the elastically deformable portion 33 in the front-rear direction. The same applies to the second elastically deformable portion 332, the third elastically deformable portion 333, and the fourth elastically deformable portion 334. Accordingly, the third elastic modulus of the elastically deformable portion 33 is smaller than the second elastic modulus of the elastically deformable portion 33. More specifically, the third elastic modulus of each of the first elastically deformable portion 331, the second elastically deformable portion 332, the third elastically deformable portion 333, and the fourth elastically deformable portion 334 is smaller than the second elastic modulus of each of the first elastically deformable portion 331, the second elastically deformable portion 332, the third elastically deformable portion 333, and the fourth elastically deformable portion 334. That is, the elastically deformable portion 33 is more likely to elastically deform in the up-down direction than in the front-rear direction. More specifically, each of the first elastically deformable portion 331, the second elastically deformable portion 332, the third elastically deformable portion 333, and the fourth elastically deformable portion 334 is more likely to elastically deform in the up-down direction than in the front-rear direction.

As illustrated in FIG. 6, the actuator 4 includes a first piezoelectric film 41, a first electrode (not illustrated), and a second electrode (not illustrated). The actuator 4 has a film shape.

As illustrated in FIG. 6, the actuator 4 has a first principal surface US4 and a second principal surface LS4. As illustrated in FIG. 1, the first principal surface US4 is located above the second principal surface LS4. The first principal surface US4 and the second principal surface LS4 are parallel to each other. The first principal surface US4 is an upper surface of the first electrode. The second principal surface LS4 is a lower surface of the second electrode. As illustrated in FIG. 6, each of the first principal surface US4 and the second principal surface LS4 has a rectangular shape having a short side extending in the left-right direction and a long side extending in the front-rear direction as viewed in the up-down direction.

The first piezoelectric film 41 is a piezoelectric body. That is, the actuator 4 includes a piezoelectric body. As illustrated in FIG. 6, the first piezoelectric film 41 has an upper principal surface and a lower principal surface. The principal surfaces of the first piezoelectric film 41 has a rectangular shape as viewed in the up-down direction. More specifically, each of the upper principal surface of the first piezoelectric film 41 and the lower principal surface of the first piezoelectric film 41 has a rectangular shape having a long side extending in the left-right direction and a short side extending in the front-rear direction as viewed in the up-down direction.

The first electrode is provided on an upper surface of the first piezoelectric film 41 (not illustrated). The second electrode is provided on a lower surface of the first piezoelectric film 41 (not illustrated). Each of the first electrode and the second electrode is a metal film formed by vapor deposition.

As illustrated in FIG. 5, the actuator 4 is attached to the fixing portion 31 of the support member 3 and the vibration portion 32 of the support member 3. More specifically, a left end portion LE4 of the actuator 4 is attached to the vibration portion 32 with an adhesive (not illustrated) interposed therebetween in a state where the actuator 4 is slightly extended in the left-right direction, and a right end portion RE4 of the actuator 4 is attached to the first fixing portion 31*a* with an adhesive (not illustrated) interposed therebetween in a state where the actuator 4 is slightly extended in the left-right direction.

When an AC voltage is applied to the actuator 4, the actuator 4 stretches and contracts in the left-right direction. More specifically, when an AC voltage is applied between the first electrode and the second electrode, the first piezoelectric film 41 stretches and contracts in the left-right direction. For example, when a positive voltage is applied to the actuator 4, the actuator 4 is stretched in the left-right direction. On the other hand, when a negative voltage is applied to the actuator 4, the actuator 4 contracts in the left-right direction. Therefore, when an AC voltage is applied to the actuator 4, the actuator 4 vibrates in the left-right direction. Accordingly, the actuator 4 vibrates the vibrated member 2 and the vibration portion 32 of the support member 3 in the left-right direction. Note that the AC voltage is a voltage at which the polarity cyclically changes between positive and negative.

The sensor 5 detects a force applied to the vibrated member 2 and displacement of the vibrated member 2 in the left-right direction. More specifically, the sensor 5 includes a plurality of sensor portions. In the present embodiment, as illustrated in FIG. 5, the sensor 5 includes four sensor portions. The four sensor portions are referred to as a first sensor portion 51, a second sensor portion 52, a third sensor portion 53, and a fourth sensor portion 54, respectively. The sensor 5 is attached to the elastically deformable portion 33. In the present embodiment, the plurality of sensor portions are attached to any one of the first elastically deformable portion 331, the second elastically deformable portion 332, the third elastically deformable portion 333, and the fourth elastically deformable portion 334 of the elastically deformable portion 33. For example, as illustrated in FIG. 5, the first sensor portion 51 is attached to the first elastically deformable portion 331. The second sensor portion 52 is attached to the second elastically deformable portion 332. The third sensor portion 53 is attached to the third elastically deformable portion 333. The fourth sensor portion 54 is attached to the fourth elastically deformable portion 334.

In the present embodiment, each of the first sensor portion 51 and the fourth sensor portion 54 detects a force applied to the vibrated member 2. Hereinafter, each of the first sensor portion 51 and the fourth sensor portion 54 will be described. Note that the fourth sensor portion 54 has the same structure as in the first sensor portion 51. Therefore, hereinafter, the description will be given focusing on the first sensor portion 51, and the description of the fourth sensor portion 54 will be omitted.

As illustrated in FIGS. 7 and 8, the first sensor portion 51 includes a second piezoelectric film 511, a third electrode U51, a fourth electrode D51, a first charge amplifier 512, and a first integration circuit 513. That is, the sensor 5 includes a piezoelectric film. The first sensor portion 51 has a film shape.

As illustrated in FIG. 8, the first sensor portion 51 has an upper principal surface US51 and a lower principal surface LS51. The upper principal surface US51 is located above the lower principal surface LS51. The upper principal surface US51 and the lower principal surface LS51 are parallel to each other. Each of the upper principal surface US51 and the lower principal surface LS51 has a rectangular shape as viewed in the up-down direction. Each of the upper principal surface US51 and the lower principal surface LS51 has a short side extending in the left-right direction and a long side extending in the front-rear direction.

As illustrated in FIG. 8, the second piezoelectric film 511 has an upper principal surface and a lower principal surface. The upper principal surface of the second piezoelectric film 511 is located above the lower principal surface of the second piezoelectric film 511. The upper principal surface of the second piezoelectric film 511 and the lower principal surface of the second piezoelectric film 511 are parallel to each other. Each of the upper principal surface of the second piezoelectric film 511 and the lower principal surface of the second piezoelectric film 511 has a rectangular shape as viewed in the up-down direction. Each of the upper principal surface of the second piezoelectric film 511 and the lower principal surface of the second piezoelectric film 511 has a short side extending in the left-right direction and a long side extending in the front-rear direction.

The second piezoelectric film 511 generates a charge corresponding to a differential value of displacement of the second piezoelectric film 511.

Specifically, the second piezoelectric film 511 is a film made of polyvinylidene fluoride (PVDF). PVDF has piezoelectricity in which molecules are oriented when uniaxial stretching is performed. The second piezoelectric film 511 has a piezoelectric constant of d31.

As illustrated in FIG. 7, a uniaxial stretching axis OD1 of the second piezoelectric film 511 forms an angle of 0 degrees or 180 degrees with respect to the front-rear direction. That is, the second piezoelectric film 511 is stretched at least in a uniaxial direction. This angle of 0 degrees or 180 degrees includes, for example, an angle including about 0 degrees±10 degrees or about 180 degrees±10 degrees.

Accordingly, the second piezoelectric film 511 is deformed such that the second piezoelectric film 511 is stretched in the front-rear direction or deformed such that the second piezoelectric film 511 is compressed in the front-rear direction, thereby generating charges. For example, when the second piezoelectric film 511 is deformed so as to be stretched or compressed in the front-rear direction, positive charges are generated. The magnitude of the generated charge depends on the differential value of the displacement of the second piezoelectric film 511 due to expansion or compression.

The third electrode U51 is a ground electrode. The third electrode U51 is connected to a ground potential. As illustrated in FIG. 8, the third electrode U51 is provided on the upper principal surface of the second piezoelectric film 511. The third electrode U51 covers the upper principal surface of the second piezoelectric film 511. That is, the upper principal surface US51 of the first sensor portion 51 is an upper surface of the third electrode U51. The third electrode U51 is, for example, a metal film formed by vapor deposition.

The fourth electrode D51 is a signal electrode. As illustrated in FIG. 8, the fourth electrode D51 is provided on the lower principal surface of the second piezoelectric film 511. The fourth electrode D51 covers the lower principal surface of the second piezoelectric film 511. That is, the lower principal surface LS51 of the first sensor portion 51 is a lower surface of the fourth electrode D51. The fourth electrode D51 is, for example, a metal film formed by vapor deposition.

The first charge amplifier 512 converts the charge generated by the second piezoelectric film 511 into a voltage signal. After the conversion, the first charge amplifier 512 outputs the voltage signal to the first integration circuit 513.

The first integration circuit 513 time-integrates the voltage signal. Accordingly, the first sensor portion 51 outputs a first detection signal indicating a relationship between a deformation amount of the second piezoelectric film 511 and the time.

In the present embodiment, each of the second sensor portion 52 and the third sensor portion 53 detects displacement of the vibrated member 2 in the left-right direction. Hereinafter, each of the second sensor portion 52 and the third sensor portion 53 will be described. Note that the third sensor portion 53 has the same structure as in the second sensor portion 52. Therefore, hereinafter, the description will be given focusing on the second sensor portion 52, and the description of the third sensor portion 53 will be omitted. Regarding the second sensor portion 52, only portions different from those of the first sensor portion 51 will be described, and the description thereof will be omitted.

As illustrated in FIGS. 9 and 10, the second sensor portion 52 includes a third piezoelectric film 521, a fifth electrode U52, a sixth electrode D52, a second charge amplifier 522, and a second integration circuit 523.

The third piezoelectric film 521 is a film made of a chiral polymer. The chiral polymer is, for example, polylactic acid (PLA), particularly poly-L-lactic acid (PLLA). PLLA, which is a chiral polymer, has a main chain with a helical structure. PLLA has piezoelectricity in which molecules are oriented when uniaxial stretching is performed. The third piezoelectric film 521 has a piezoelectric constant of d14.

The third piezoelectric film 521 has a characteristic in which the polarity of the charge generated when the third piezoelectric film 521 is stretched in the left-right direction is opposite to the polarity of the charge generated when the second piezoelectric film 511 is stretched in the front-rear direction.

As illustrated in FIG. 9, a uniaxial stretching axis OD2 of the third piezoelectric film 521 forms an angle of 45 degrees counterclockwise with respect to the left-right direction, and forms an angle of 45 degrees clockwise with respect to the front-rear direction. That is, the third piezoelectric film 521 is a film having polylactic acid stretched at least in a uniaxial direction. This angle of 45 degrees includes, for example, an angle including about 45 degrees±10 degrees. Accordingly, the third piezoelectric film 521 is deformed such that the third piezoelectric film 521 is stretched in the left-right direction or deformed such that the third piezoelectric film 521 is compressed in the left-right direction, thereby generating charges. For example, when the third piezoelectric film 521 is deformed to be stretched in the left-right direction, positive charges are generated. For example, when the third piezoelectric film 521 is deformed to be compressed in the left-right direction, negative charges are generated. The magnitude of the generated charge depends on the differential value of the displacement of the third piezoelectric film 521 due to expansion or compression.

Effects

According to the vibration device 10, it is possible to detect a force applied to the operation target and to detect displacement of the operation target in a direction orthogonal to a direction of the force applied to the operation target without attaching a sensor to the operation target. More specifically, the support member 3 includes the elastically deformable portion 33 connecting the fixing portion 31 and the vibration portion 32 and elastically deforming. The vibration portion 32 supports the vibrated member 2. Therefore, when a force is applied to the vibrated member 2 in the up-down direction, the elastically deformable portion 33 elastically deforms in the up-down direction. The sensor 5 detecting a force applied to the vibrated member 2 is attached to the elastically deformable portion 33. The third elastic modulus of the elastically deformable portion 33 in the up-down direction is smaller than the second elastic modulus of the elastically deformable portion 33 in the front-rear direction. Therefore, the elastically deformable portion 33 is likely to elastically deform in the up-down direction. Accordingly, the sensor 5 can detect deformation of the elastically deformable portion 33 in the up-down direction. As a result, according to the vibration device 10, a force applied to the vibrated member 2 can be detected without attaching the sensor 5 to the vibrated member 2.

The vibrated member 2 vibrates in the left-right direction. With the vibration of the vibrated member 2 in the left-right direction, the vibration portion 32 vibrates in the left-right direction. With the vibration of the vibration portion 32 in the left-right direction, the elastically deformable portion 33 elastically deforms in the left-right direction. The first elastic modulus of the elastically deformable portion 33 in the left-right direction is smaller than the second elastic modulus of the elastically deformable portion 33 in the front-rear direction. Therefore, the elastically deformable portion 33 is likely to elastically deform in the left-right direction. Accordingly, the sensor 5 can detect deformation of the elastically deformable portion 33 in the left-right direction. As a result, according to the vibration device 10, the displacement of the vibrated member 2 in the left-right direction can be detected without attaching the sensor 5 to the vibrated member 2.

Second Embodiment

Figure 11:
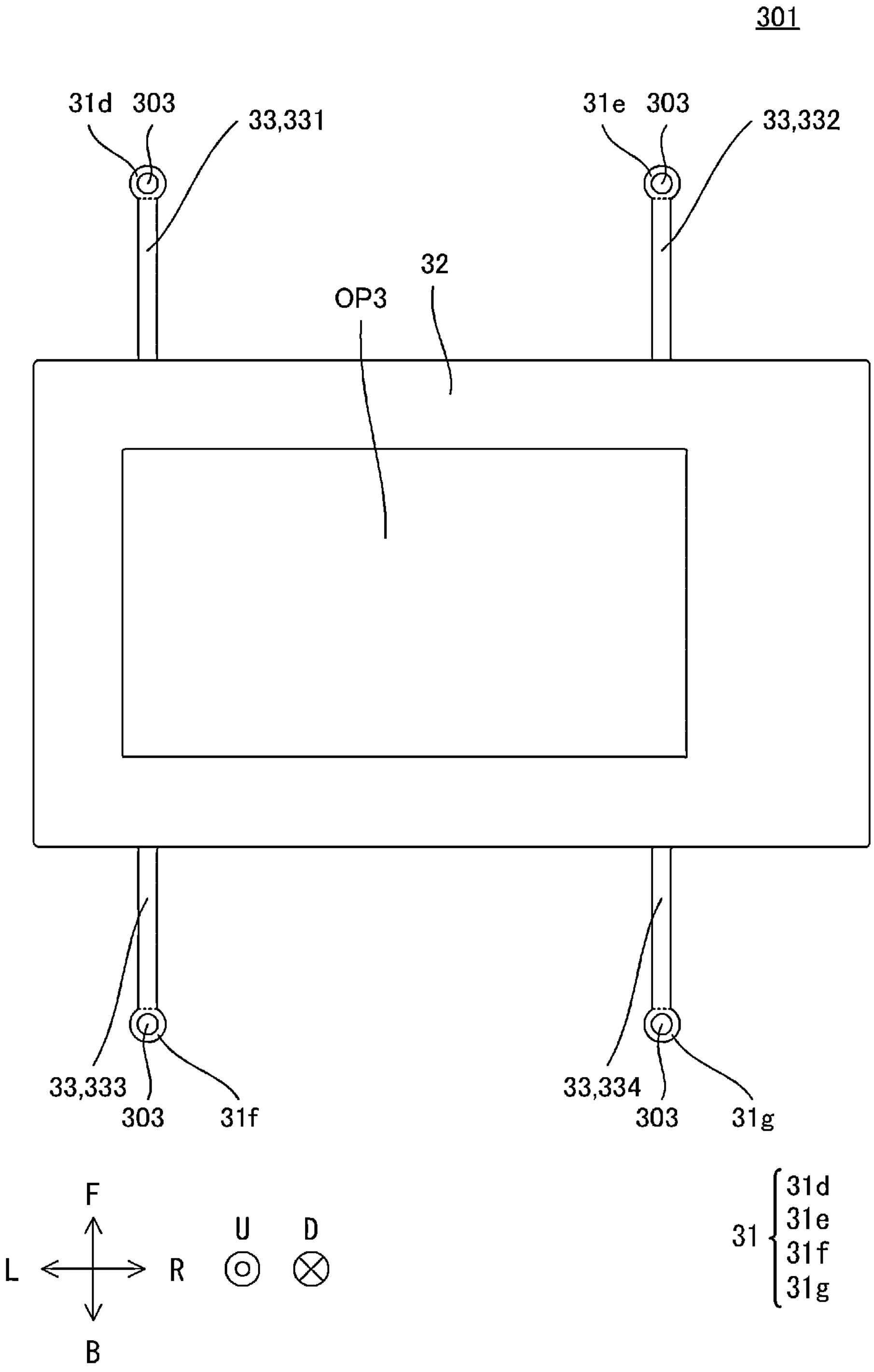
FIG. 11 is a plan view of a substrate 301 according to a second embodiment as viewed in the downward direction.
Figure 12:
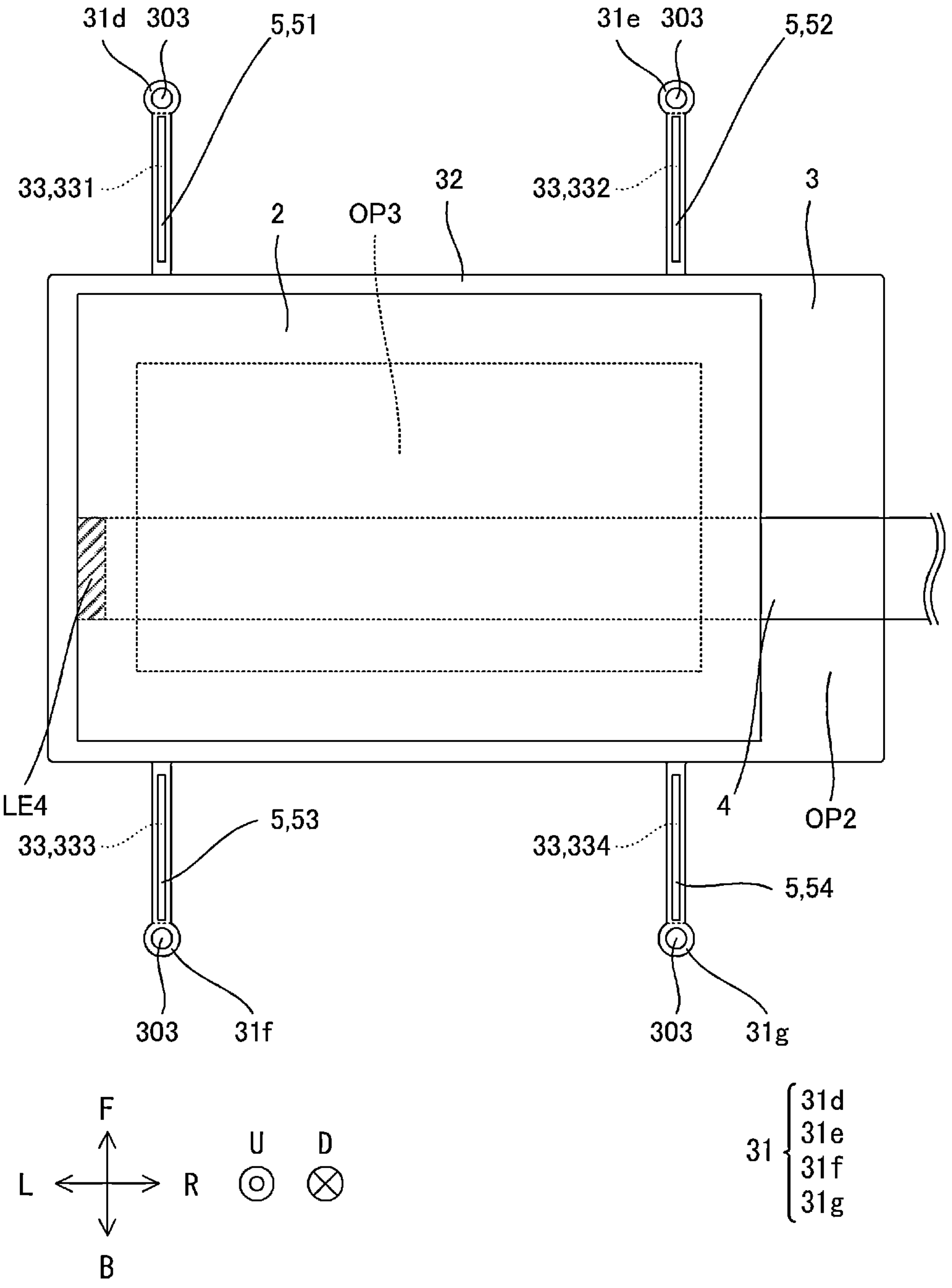
FIG. 12 is a plan view of a vibrated member 2, a support member 3, an actuator 4, and a sensor 5 according to the second embodiment as viewed in the downward direction.

Hereinafter, a vibration device 10*a* according to a second embodiment of the present disclosure will be described with reference to the drawings. FIG. 11 is a plan view of a substrate 301 according to a second embodiment as viewed in the downward direction. FIG. 12 is a plan view of a vibrated member 2, a support member 3, an actuator 4, and a sensor 5 according to the second embodiment as viewed in the downward direction. Regarding the vibration device 10*a* according to the second embodiment, only portions different from those of the vibration device 10 according to the first embodiment will be described, and the description thereof will be omitted.

The vibration device 10*a* is different from the vibration device 10 in that the fixing portion 31 includes a fourth fixing portion 31*d*, a fifth fixing portion 31*e*, a sixth fixing portion 31*f*, and a seventh fixing portion 31*g*, the position of the elastically deformable portion 33 is different, and the right end portion RE4 of the actuator 4 is attached to the housing 1 with an adhesive (not illustrated) interposed therebetween in a state where the actuator 4 is slightly extended in the left-right direction.

As illustrated in FIG. 12, each of the fourth fixing portion 31*d*, the fifth fixing portion 31*e*, the sixth fixing portion 31*f*, and the seventh fixing portion 31*g* has the screw hole 303. Each of the fourth fixing portion 31*d*, the fifth fixing portion 31*e*, the sixth fixing portion 31*f*, and the seventh fixing portion 31*g* is fixed to the housing 1 by inserting the bolt 6 into each of the screw hole 303 and a screw hole (not illustrated) of the housing 1 from below the screw hole 303. Accordingly, the fixing portion 31 is fixed to the housing 1.

As illustrated in FIG. 12, the fourth fixing portion 31*d* is located above the vibration portion 32 as viewed in the up-down direction. The fifth fixing portion 31*e* is located in front of the vibration portion 32 as viewed in the up-down direction. The fifth fixing portion 31*e* is located on the right of the fourth fixing portion 31*d* as viewed in the up-down direction. The sixth fixing portion 31*f* is located behind the vibration portion 32 as viewed in the up-down direction. The seventh fixing portion 31*g* is located behind the vibration portion 32 as viewed in the up-down direction. The seventh fixing portion 31*g* is located on the right of the sixth fixing portion 31*f* as viewed in the up-down direction.

As illustrated in FIG. 11, the first elastically deformable portion 331 is located above the vibration portion 32 of the support member 3. The first elastically deformable portion 331 viewed in the up-down direction overlaps a left portion of the vibration portion 32 viewed in the up-down direction as viewed in the front-rear direction. The first elastically deformable portion 331 connects the fourth fixing portion 31*d* and the vibration portion 32.

As illustrated in FIG. 11, the second elastically deformable portion 332 is located above the vibration portion 32 of the support member 3. The second elastically deformable portion 332 viewed in the up-down direction overlaps a right portion of the vibration portion 32 viewed in the up-down direction as viewed in the front-rear direction. The second elastically deformable portion 332 connects the fifth fixing portion 31*e* and the vibration portion 32.

As illustrated in FIG. 11, the third elastically deformable portion 333 is located below the vibration portion 32 of the support member 3. The third elastically deformable portion 333 viewed in the up-down direction overlaps the left portion of the vibration portion 32 viewed in the up-down direction as viewed in the front-rear direction. The third elastically deformable portion 333 connects the sixth fixing portion 31*f* and the vibration portion 32.

As illustrated in FIG. 11, the fourth elastically deformable portion 334 is located below the vibration portion 32 of the support member 3. The fourth elastically deformable portion 334 viewed in the up-down direction overlaps the right portion of the vibration portion 32 viewed in the up-down direction as viewed in the front-rear direction. The fourth elastically deformable portion 334 connects the seventh fixing portion 31*g* and the vibration portion 32.

The actuator 4 is attached to the housing 1 and the vibration portion 32 of the support member 3.

The vibration device 10*a* as described above also has the same effect as the vibration device 10.

Third Embodiment

Figure 13:
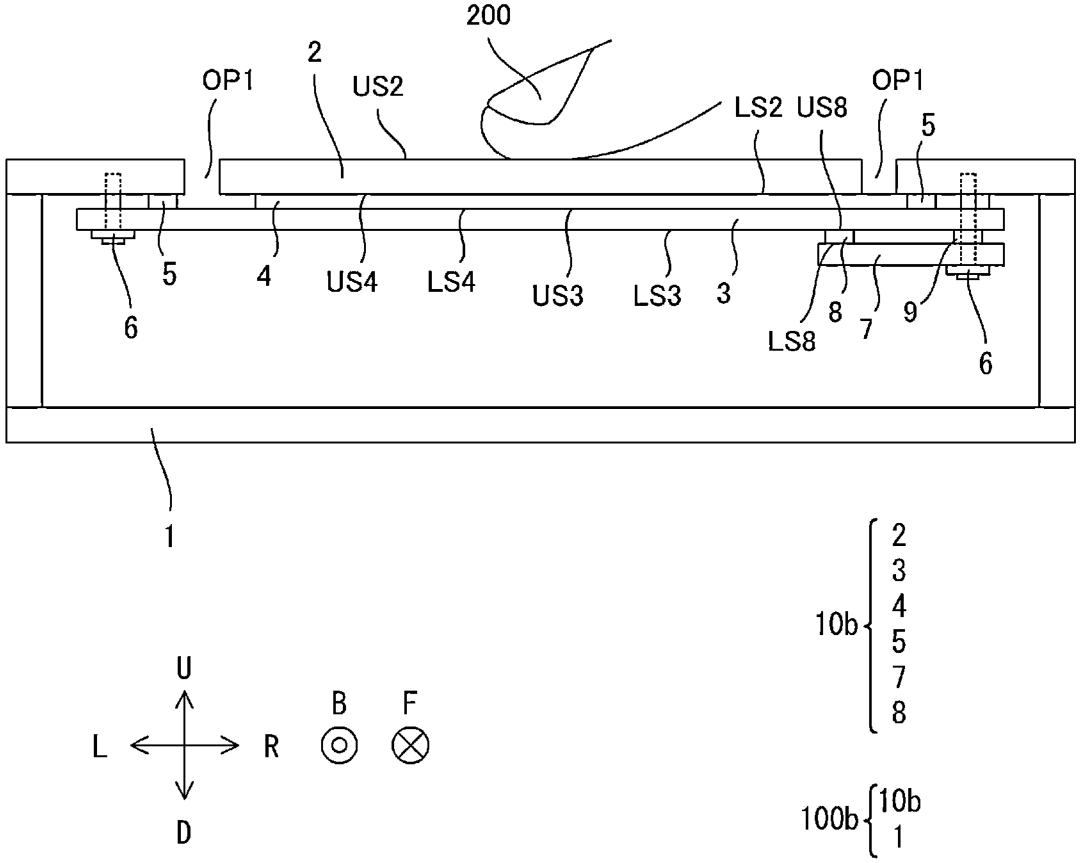
FIG. 13 is a sectional view of an electronic device 100*b* according to a third embodiment as view in the front direction.
Figure 14:
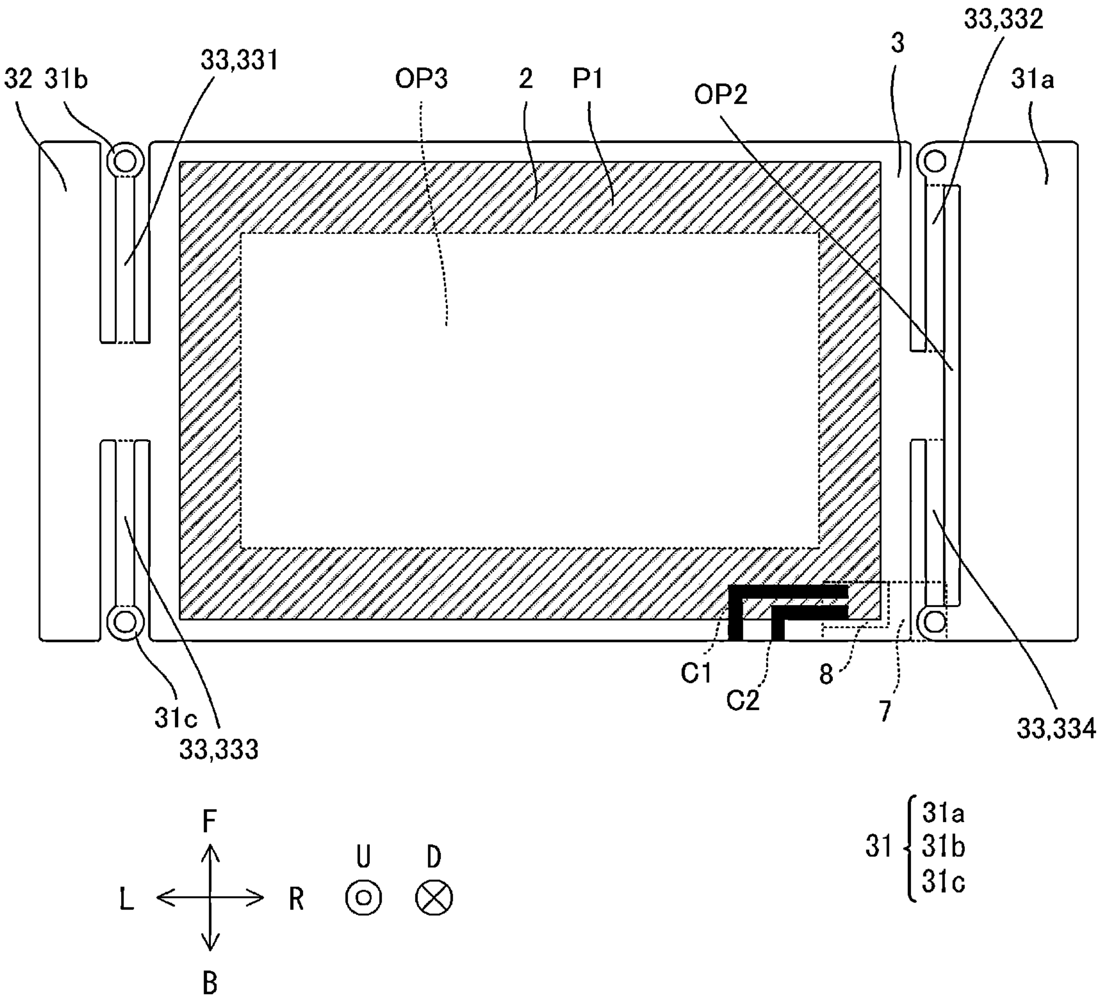
FIG. 14 is a plan view of a vibrated member 2, a support member 3, a stopper 7, and a conductive cushion member 8 according to the third embodiment as viewed in the downward direction.

Hereinafter, a vibration device 10*b* according to a third embodiment of the present disclosure will be described with reference to the drawings. FIG. 13 is a sectional view of an electronic device 100*b* according to a third embodiment as view in the front direction. FIG. 14 is a plan view of a vibrated member 2, a support member 3, a stopper 7, and a conductive cushion member 8 according to the third embodiment as viewed in the downward direction. In FIG. 14, the plurality of conductor patterns 302 are omitted. Regarding the vibration device 10*b* according to the third embodiment, only portions different from those of the vibration device 10 according to the first embodiment will be described, and the description thereof will be omitted.

As illustrated in FIG. 13, the vibration device 10*b* is different from the vibration device 10 in that the vibration device 10*b* further includes a vibrated member 2, a stopper 7, a conductive cushion member 8, and a spacer 9.

As illustrated in FIG. 13, the stopper 7 is fixed to the housing 1. More specifically, the stopper 7 has one screw hole (not illustrated). The stopper 7 is fixed to the housing 1 by the bolt 6 from below the screw hole. Therefore, the position of the stopper 7 in the up-down direction is fixed.

In the present embodiment, in order to fix the fixing portion 31 to the housing 1, the spacer 9 is provided between the fixing portion 31 of the support member 3 and the stopper 7. As illustrated in FIG. 14, the stopper 7 overlaps the vibrated member 2 as viewed in the up-down direction.

The conductive cushion member 8 has conductivity. The conductive cushion member 8 has a rectangular parallelepiped shape. Therefore, as illustrated in FIG. 13, the conductive cushion member 8 has an upper principal surface US8 and a lower principal surface LS8 arranged in the up-down direction. The upper principal surface US8 is located above the lower principal surface LS8. The upper principal surface US8 and the lower principal surface LS8 are parallel to each other.

The resistance value of the conductive cushion member 8 changes due to expansion and contraction. More specifically, the resistance value of the conductive cushion member 8 is increased by the conductive cushion member being compressed. The resistance value of the conductive cushion member 8 is increased by the conductive cushion member being stretched.

As illustrated in FIG. 14, the vibration portion 32 of the support member 3 has a first portion P1 overlapping the vibrated member 2 as viewed in the up-down direction. A first conductor pattern C1 and a second conductor pattern C2 are provided in a part of the first portion P1.

Each of the first conductor pattern C1 and the second conductor pattern C2, the conductive cushion member 8, and the stopper 7 are arranged in this order without a space from the top to the bottom. That is, the upper principal surface US8 of the conductive cushion member 8 is in contact with each of the first conductor pattern C1 and the second conductor pattern C2. The lower principal surface LS8 of the conductive cushion member 8 is in contact with the stopper 7.

The first conductor pattern C1 is electrically connected to the second conductor pattern C2 with the conductive cushion member 8 interposed therebetween.

The vibration device 10*b* as described above also has the same effect as the vibration device 10. According to the vibration device 10*b*, a force applied to an operation target can be accurately detected without attaching a sensor to the operation target. More specifically, the vibration portion 32 has a first portion P1 overlapping the vibrated member 2 as viewed in the up-down direction. A first conductor pattern C1 and a second conductor pattern C2 are provided in a part of the first portion P1. The first conductor pattern C1 is electrically connected to the second conductor pattern C2 with the conductive cushion member 8 interposed therebetween. In the conductive cushion member 8, the upper principal surface US8 is in contact with the first conductor pattern C1 and the second conductor pattern C2, and the lower principal surface LS8 is in contact with the stopper 7 whose position in the up-down direction is fixed. When a force is applied to the vibrated member 2 in the downward direction, the conductive cushion member 8 is compressed. Accordingly, the resistance of the conductive cushion member 8 decreases. Therefore, a force applied to the vibrated member 2 can be detected by detecting a change in resistance between the first conductor pattern C1 and the second conductor pattern C2. As a result, according to the vibration device 10*b*, a force applied to an operation target can be accurately detected without attaching a sensor to the operation target.

[Other Embodiments]

The vibration device according to the present disclosure is not limited to the vibration devices 10, 10*a*, and 10*b*, and can be modified in the scope of the gist of the present disclosure. Further, structures of the vibration devices 10, 10*a*, and 10*b* may be optionally combined. The electronic device according to the present disclosure is not limited to the electronic devices 100, 100*a*, and 100*b*, and may be modified in any way within the scope of the essence thereof. In addition, the structures of the electronic devices 100, 100*a*, and 100*b* may be arbitrarily combined.

Note that the use application of the electronic device 100 is not limited to providing tactile feedback to the user 200.

Note that, as illustrated in FIG. 1, the vibration device 10 and the vibrated member 2 may be modularized to form a vibration device 20.

Note that, as illustrated in FIG. 1, the vibration device 10 and the housing 1 may be modularized to form an electronic device 30.

Note that the actuator 4 may be attached to the fixing portion 31 of the support member 3 or the housing 1, and the vibrated member 2.

Note that the vibration device 10 is not limited to being used for the electronic device 100.

Note that the "fixing member" of the present disclosure is not limited to the housing 1. The "fixing member" of the present disclosure may be, for example, an electronic component or the like fixed to the housing 1.

Note that the vibrated member 2 may be pressed by an operation member without limited to the user 200.

Note that the housing 1 is not limited to a rectangular parallelepiped box.

Note that the first opening OP1 may not have a rectangular shape in the up-down direction.

Note that the vibrated member 2 may not have a plate shape. The vibrated member 2 may not have the upper principal surface US2 and the lower principal surface LS2 arranged in the up-down direction. The upper principal surface US2 and the lower principal surface LS2 may not be parallel to each other.

Each of the upper principal surface US2 and the lower principal surface LS2 may not have a rectangular shape having a long side extending in the left-right direction and a short side extending in the front-rear direction.

The position of the vibrated member 2 in the up-down direction may not be equal to the position of the upper surface of the housing 1 in the up-down direction.

The vibrated member 2 may not be located in the first opening OP1 as viewed in the up-down direction.

The vibrated member 2 may be in contact with the housing 1.

The material of the substrate 301 is not limited to glass epoxy, and may be a metal such as stainless used steel (SUS).

Note that the substrate 301 may not have a plate shape. The substrate 301 may not have the upper principal surface US301 and the lower principal surface LS301 arranged in the up-down direction. The upper principal surface US301 and the lower principal surface LS301 may not be parallel to each other.

Each of the upper principal surface US301 and the lower principal surface LS301 of the substrate 301 may not have a rectangular shape having a long side extending in the left-right direction and a short side extending in the front-rear direction.

The plurality of conductor patterns 302 are not limited to being formed by patterning a copper foil attached to the substrate 301 by photolithography or the like. In the vibration devices 10 and 10*a*, the plurality of conductor patterns 302 are not essential constituent elements.

Each of the first fixing portion 31*a*, the second fixing portion 31*b*, and the third fixing portion 31*c* may be fixed to the housing 1 with an adhesive. Therefore, each of the first fixing portion 31*a*, the second fixing portion 31*b*, and the third fixing portion 31*c* may not have the screw hole 303. The housing 1 may not have a screw hole. The bolt 6 is not an essential constituent element.

Note that the first fixing portion 31*a* may not be provided with the second opening OP2.

Note that the vibration portion 32 may not be provided with the third opening OP3.

Note that the vibrated member 2 is not limited to being provided on the upper surface of the vibration portion 32.

Note that the length of the elastically deformable portion 33 in the left-right direction may not be shorter than the length of the elastically deformable portion 33 in the front-rear direction. The first elastic modulus of the elastically deformable portion 33 may be smaller than the second elastic modulus of the elastically deformable portion 33.

Note that the length of the elastically deformable portion 33 in the left-right direction may not be shorter than the length of the elastically deformable portion 33 in the front-rear direction. The third elastic modulus of the elastically deformable portion 33 may be smaller than the second elastic modulus of the elastically deformable portion 33.

Note that the elastically deformable portion 33 may not include the first elastically deformable portion 331, the second elastically deformable portion 332, the third elastically deformable portion 333, and the fourth elastically deformable portion 334.

Note that the actuator 4 may not include a piezoelectric body. The actuator 4 may be, for example, a linear resonant actuator (LRA).

Note that the actuator 4 may not have a film shape. The actuator 4 may not have the first principal surface US4 and the second principal surface LS4 arranged in the up-down direction. The first principal surface US4 and the second principal surface LS4 may not be parallel to each other.

Note that each of the first principal surface US4 and the second principal surface LS4 may not have a rectangular shape having a long side extending in the left-right direction and a short side extending in the front-rear direction.

Note that the principal surfaces of the first piezoelectric film 41 may not have a rectangular shape as viewed in the up-down direction. Each of the upper principal surface of the first piezoelectric film 41 and the lower principal surface of the first piezoelectric film 41 may not have a rectangular shape having a long side extending in the left-right direction and a short side extending in the front-rear direction as viewed in the up-down direction.

Note that at least any one of the first sensor portion 51, the second sensor portion 52, the third sensor portion 53, and the fourth sensor portion 54 may detect a force applied to the vibrated member 2. At least any one of the first sensor portion 51, the second sensor portion 52, the third sensor portion 53, and the fourth sensor portion 54 may detect displacement of the vibrated member 2 in the left-right direction.

Note that the sensor 5 may not include four sensor portions. Therefore, the number of sensor portions detecting a force applied to the vibrated member 2 may be different from the number of sensor portions detecting displacement of the vibrated member 2 in the left-right direction.

Note that each of the upper principal surface US51 and the lower principal surface LS51 of the first sensor portion 51 may not have a rectangular shape as viewed in the up-down direction. Each of the upper principal surface US51 and the lower principal surface LS51 may not have a short side extending in the left-right direction and a long side extending in the front-rear direction. The upper principal surface US51 and the lower principal surface LS51 may not be parallel to each other.

Note that each of an upper principal surface US52 and a lower principal surface LS52 of the second sensor portion 52 may not have a rectangular shape as viewed in the up-down direction. Each of the upper principal surface US52 and the lower principal surface LS52 may not have a short side extending in the left-right direction and a long side extending in the front-rear direction. The upper principal surface US52 and the lower principal surface LS52 may not be parallel to each other.

Note that each of an upper principal surface and a lower principal surface of the third sensor portion 53 may not have a rectangular shape as viewed in the up-down direction. Each of the upper principal surface and the lower principal surface of the third sensor portion 53 may not have a short side extending in the left-right direction and a long side extending in the front-rear direction. The upper principal surface and the lower principal surface of the third sensor portion 53 may not be parallel to each other.

Note that each of an upper principal surface and a lower principal surface of the fourth sensor portion 54 may not have a rectangular shape as viewed in the up-down direction. Each of the upper principal surface and the lower principal surface of the fourth sensor portion 54 may not have a short side extending in the left-right direction and a long side extending in the front-rear direction. The upper principal surface and the lower principal surface of the fourth sensor portion 54 may not be parallel to each other.

Note that the upper principal surface of the second piezoelectric film 511 and the lower principal surface of the second piezoelectric film 511 may not be parallel to each other. Each of the upper principal surface of the second piezoelectric film 511 and the lower principal surface of the second piezoelectric film 511 may not have a short side extending in the left-right direction and a long side extending in the front-rear direction.

Note that the upper principal surface of the third piezoelectric film 521 and the lower principal surface of the third piezoelectric film 521 may not be parallel to each other. Each of the upper principal surface of the third piezoelectric film 521 and the lower principal surface of the third piezoelectric film 521 may not have a short side extending in the left-right direction and a long side extending in the front-rear direction.

Note that the uniaxial stretching axis OD1 of the second piezoelectric film 511 is not limited to forming an angle of 0 degrees or 180 degrees with respect to the front-rear direction. For example, the uniaxial stretching axis OD1 of the second piezoelectric film 511 may form an angle of 0 degrees or 180 degrees with respect to the left-right direction.

Note that the conductive cushion member 8 may not have a rectangular parallelepiped shape.

Note that the stopper 7 may be fixed to the housing 1 with an adhesive. Therefore, the stopper 7 may not have a screw hole.

Note that the spacer 9 is not an essential constituent element.

Note that the resistance value of the conductive cushion member 8 may be reduced by the conductive cushion member being compressed. The resistance value of the conductive cushion member 8 may be increased by the conductive cushion member being stretched. The resistance value of the conductive cushion member 8 may change due to expansion and contraction.

Each of the first conductor pattern C1 and the second conductor pattern C2, the conductive cushion member 8, and the stopper 7 may be arranged in this order with a space from the top to the bottom.

The present disclosure has the following structures.

(1) A vibration device including: a support member that includes: a fixing portion fixed to a fixing member, a vibration portion supporting a vibrated member, and an elastically deformable portion connecting the fixing portion and the vibration portion; an actuator constructed to vibrate a vibrated member in a left-right direction, the actuator being attached to the fixing portion or the fixing member and the vibration portion or the vibrated member; and a sensor constructed to detect a force applied to the vibrated member and displacement of the vibrated member in the left-right direction, the sensor being attached to the elastically deformable portion, wherein the elastically deformable portion has a first elastic modulus in the left-right direction, a second elastic modulus in a front-rear direction, and a third elastic modulus in a up-down direction, the first elastic modulus is smaller than the second elastic modulus, and the third elastic modulus is smaller than the second elastic modulus.

(2) The vibration device according to (1), wherein a length of the elastically deformable portion in the left-right direction is shorter than a length of the elastically deformable portion in the front-rear direction, and a length of the elastically deformable portion in the up-down direction is shorter than the length of the elastically deformable portion in the front-rear direction.

(3) The vibration device according to (1) or (2), wherein the elastically deformable portion includes a first elastically deformable portion, a second elastically deformable portion, a third elastically deformable portion, and a fourth elastically deformable portion, the sensor includes a plurality of sensor portions attached to any one of the first elastically deformable portion, the second elastically deformable portion, the third elastically deformable portion, and the fourth elastically deformable portion, each of the plurality of sensor portions is constructed to detect the force applied to the vibrated member or the displacement of the vibrated member in the left-right direction, the first elastically deformable portion is located on a left of the vibration portion in the left-right direction, the second elastically deformable portion is located on a right of the vibration portion in the left-right direction, the third elastically deformable portion is located on the left of the vibration portion in the left-right direction, the fourth elastically deformable portion is located on the right of the vibration portion in the left-right direction, the first elastically deformable portion viewed in the up-down direction overlaps a front portion of the vibration portion viewed in the up-down direction as viewed in the left-right direction, the second elastically deformable portion viewed in the up-down direction overlaps the front portion of the vibration portion viewed in the up-down direction as viewed in the left-right direction, the third elastically deformable portion viewed in the up-down direction overlaps a rear portion of the vibration portion viewed in the up-down direction as viewed in the left-right direction, and the fourth elastically deformable portion viewed in the up-down direction overlaps the rear portion of the vibration portion viewed in the up-down direction as viewed in the left-right direction.

(4) The vibration device according to (1) or (2), wherein the elastically deformable portion includes a first elastically deformable portion, a second elastically deformable portion, a third elastically deformable portion, and a fourth elastically deformable portion, the sensor includes a plurality of sensor portions attached to any one of the first elastically deformable portion, the second elastically deformable portion, the third elastically deformable portion, and the fourth elastically deformable portion, each of the plurality of sensor portions is constructed to detect the force applied to the vibrated member or the displacement of the vibrated member in the left-right direction, the first elastically deformable portion is located above the vibration portion in the up-down direction, the second elastically deformable portion is located above the vibration portion in the up-down direction, the third elastically deformable portion is located below the vibration portion in the up-down direction, the fourth elastically deformable portion is located below the vibration portion in the up-down direction, the first elastically deformable portion viewed in the up-down direction overlaps a left portion of the vibration portion viewed in the up-down direction as viewed in the front-rear direction, the second elastically deformable portion viewed in the up-down direction overlaps a right portion of the vibration portion viewed in the up-down direction as viewed in the front-rear direction, the third elastically deformable portion viewed in the up-down direction overlaps the left portion of the vibration portion viewed in the up-down direction as viewed in the front-rear direction, and the fourth elastically deformable portion viewed in the up-down direction overlaps the right portion of the vibration portion viewed in the up-down direction as viewed in the front-rear direction.

(5) The vibration device according any one of (1) to (4), wherein the sensor includes a piezoelectric film.

(6) The vibration device according to (5), wherein a principal surface of the piezoelectric film has a rectangular shape as viewed in the up-down direction.

(7) The vibration device described in (5) or (6), wherein the piezoelectric film is a film having polylactic acid stretched at least in a uniaxial direction.

(8) The vibration device described in any one of (5) to (7), wherein the piezoelectric film has a piezoelectric constant of d14.

(9) The vibration device according to any one of (1) to (8), further including the vibrated member.

(10) The vibration device according to (9), wherein the vibration device includes: a stopper having a fixed position in the up-down direction, and a conductive cushion member having conductivity, the conductive cushion member having an upper principal surface and a lower principal surface, a resistance value of the conductive cushion member changes with expansion and contraction thereof, the vibration portion has a first portion overlapping the vibrated member as viewed in the up-down direction, a first conductor pattern and a second conductor pattern are in a part of the first portion, the upper principal surface is in contact with each of the first conductor pattern and the second conductor pattern, the lower principal surface is in contact with the stopper, and the first conductor pattern is electrically connected to the second conductor pattern with the conductive cushion member interposed therebetween.

(11) An electronic device including: the vibration device according to any one of (1) to (10); and the fixing member.

DESCRIPTION OF REFERENCE SYMBOLS

1: Housing
2: Vibrated member
3: Support member
4: Actuator
5: Sensor
6: Bolt
7: Stopper
8: Conductive cushion member
9: Spacer
10, 10*a*, 10*b*: Vibration device
31: Fixing portion
31*a*: First fixing portion
31*b*: Second fixing portion
31*c*: Third fixing portion
31*d*: Fourth fixing portion
31*e*: Fifth fixing portion
31*f*: Sixth fixing portion
31*g*: Seventh fixing portion
32: Vibration portion
33: Elastically deformable portion
41: First piezoelectric film
51: First sensor portion
52: Second sensor portion
53: Third sensor portion
54: Fourth sensor portion
100, 100*a*, 100*b*: Electronic device
200: User
301: Substrate
302: Conductor pattern
303: Screw hole
331: First elastically deformable portion 332: Second elastically deformable portion
333: Third elastically deformable portion
334: Fourth elastically deformable portion
511: Second piezoelectric film
512: First charge amplifier
513: First integration circuit
521: Third piezoelectric film
522: Second charge amplifier
523: Second integration circuit
C1: First conductor pattern
C2: Second conductor pattern
D51: Fourth electrode
D52: Sixth electrode
LE4: Left end portion
LS2, LS301, LS51, LS8: Lower principal surface
LS4: Second principal surface
OD1, OD2: Uniaxial stretching axis
OP1: First opening
OP2: Second opening
OP3: Third opening
P1: First portion
RE4: Right end portion
U51: Third electrode
U52: Fifth electrode
US2, US301, US51, US8: Upper principal surface
US4: First principal surface

The invention claimed is:

1. A vibration device comprising:
a support member that includes:
a fixing portion fixed to a fixing member,
a vibration portion supporting a vibrated member, and
an elastically deformable portion connecting the fixing portion and the vibration portion;
an actuator constructed to vibrate a vibrated member in a left-right direction, the actuator being attached to the fixing portion or the fixing member and the vibration portion or the vibrated member; and
a sensor constructed to detect a force applied to the vibrated member and displacement of the vibrated member in the left-right direction, the sensor being attached to the elastically deformable portion,
wherein
the elastically deformable portion has a first elastic modulus in the left-right direction, a second elastic modulus in a front-rear direction, and a third elastic modulus in a up-down direction,
the first elastic modulus is smaller than the second elastic modulus, and
the third elastic modulus is smaller than the second elastic modulus.

2. The vibration device according to claim 1, wherein
a length of the elastically deformable portion in the left-right direction is shorter than a length of the elastically deformable portion in the front-rear direction, and
a length of the elastically deformable portion in the up-down direction is shorter than the length of the elastically deformable portion in the front-rear direction.

3. The vibration device according to claim 1, wherein
the elastically deformable portion includes a first elastically deformable portion, a second elastically deformable portion, a third elastically deformable portion, and a fourth elastically deformable portion,
the sensor includes a plurality of sensor portions attached to any one of the first elastically deformable portion, the second elastically deformable portion, the third elastically deformable portion, and the fourth elastically deformable portion,
each of the plurality of sensor portions is constructed to detect the force applied to the vibrated member or the displacement of the vibrated member in the left-right direction,
the first elastically deformable portion is located on a left of the vibration portion in the left-right direction,
the second elastically deformable portion is located on a right of the vibration portion in the left-right direction,
the third elastically deformable portion is located on the left of the vibration portion in the left-right direction,
the fourth elastically deformable portion is located on the right of the vibration portion in the left-right direction,
the first elastically deformable portion viewed in the up-down direction overlaps a front portion of the vibration portion viewed in the up-down direction as viewed in the left-right direction,
the second elastically deformable portion viewed in the up-down direction overlaps the front portion of the vibration portion viewed in the up-down direction as viewed in the left-right direction,
the third elastically deformable portion viewed in the up-down direction overlaps a rear portion of the vibration portion viewed in the up-down direction as viewed in the left-right direction, and
the fourth elastically deformable portion viewed in the up-down direction overlaps the rear portion of the vibration portion viewed in the up-down direction as viewed in the left-right direction.

4. The vibration device according to claim 1, wherein
the elastically deformable portion includes a first elastically deformable portion, a second elastically deformable portion, a third elastically deformable portion, and a fourth elastically deformable portion,
the sensor includes a plurality of sensor portions attached to any one of the first elastically deformable portion, the second elastically deformable portion, the third elastically deformable portion, and the fourth elastically deformable portion,
each of the plurality of sensor portions is constructed to detect the force applied to the vibrated member or the displacement of the vibrated member in the left-right direction,
the first elastically deformable portion is located above the vibration portion in the up-down direction,
the second elastically deformable portion is located above the vibration portion in the up-down direction,
the third elastically deformable portion is located below the vibration portion in the up-down direction,
the fourth elastically deformable portion is located below the vibration portion in the up-down direction,
the first elastically deformable portion viewed in the up-down direction overlaps a left portion of the vibration portion viewed in the up-down direction as viewed in the front-rear direction,
the second elastically deformable portion viewed in the up-down direction overlaps a right portion of the vibration portion viewed in the up-down direction as viewed in the front-rear direction,
the third elastically deformable portion viewed in the up-down direction overlaps the left portion of the vibration portion viewed in the up-down direction as viewed in the front-rear direction, and
the fourth elastically deformable portion viewed in the up-down direction overlaps the right portion of the vibration portion viewed in the up-down direction as viewed in the front-rear direction.

5. The vibration device according to claim 1, wherein the sensor includes a piezoelectric film.

6. The vibration device according to claim 5, wherein a principal surface of the piezoelectric film has a rectangular shape as viewed in the up-down direction.

7. The vibration device according to claim 5, wherein the piezoelectric film is a film having polylactic acid stretched at least in a uniaxial direction.

8. The vibration device according to claim 5, wherein the piezoelectric film has a piezoelectric constant of d14.

9. The vibration device according to claim 1, further comprising the vibrated member.

10. The vibration device according to claim 9, wherein the vibration device comprises:

a stopper having a fixed position in the up-down direction, and a conductive cushion member having conductivity, the conductive cushion member having an upper principal surface and a lower principal surface, a resistance value of the conductive cushion member changes with expansion and contraction thereof, the vibration portion has a first portion overlapping the vibrated member as viewed in the up-down direction, a first conductor pattern and a second conductor pattern are in a part of the first portion, the upper principal surface is in contact with each of the first conductor pattern and the second conductor pattern, the lower principal surface is in contact with the stopper, and the first conductor pattern is electrically connected to the second conductor pattern with the conductive cushion member interposed therebetween.

11. An electronic device comprising:

the vibration device according to claim 1; and the fixing member.

12. The electronic device according to claim 11, wherein a length of the elastically deformable portion in the left-right direction is shorter than a length of the elastically deformable portion in the front-rear direction, and a length of the elastically deformable portion in the up-down direction is shorter than the length of the elastically deformable portion in the front-rear direction.

13. The electronic device according to claim 11, wherein the elastically deformable portion includes a first elastically deformable portion, a second elastically deformable portion, a third elastically deformable portion, and a fourth elastically deformable portion, the sensor includes a plurality of sensor portions attached to any one of the first elastically deformable portion, the second elastically deformable portion, the third elastically deformable portion, and the fourth elastically deformable portion, each of the plurality of sensor portions is constructed to detect the force applied to the vibrated member or the displacement of the vibrated member in the left-right direction, the first elastically deformable portion is located on a left of the vibration portion in the left-right direction, the second elastically deformable portion is located on a right of the vibration portion in the left-right direction, the third elastically deformable portion is located on the left of the vibration portion in the left-right direction, the fourth elastically deformable portion is located on the right of the vibration portion in the left-right direction, the first elastically deformable portion viewed in the up-down direction overlaps a front portion of the vibration portion viewed in the up-down direction as viewed in the left-right direction, the second elastically deformable portion viewed in the up-down direction overlaps the front portion of the vibration portion viewed in the up-down direction as viewed in the left-right direction, the third elastically deformable portion viewed in the up-down direction overlaps a rear portion of the vibration portion viewed in the up-down direction as viewed in the left-right direction, and the fourth elastically deformable portion viewed in the up-down direction overlaps the rear portion of the vibration portion viewed in the up-down direction as viewed in the left-right direction.

14. The electronic device according to claim 11, wherein the elastically deformable portion includes a first elastically deformable portion, a second elastically deformable portion, a third elastically deformable portion, and a fourth elastically deformable portion, the sensor includes a plurality of sensor portions attached to any one of the first elastically deformable portion, the second elastically deformable portion, the third elastically deformable portion, and the fourth elastically deformable portion, each of the plurality of sensor portions is constructed to detect the force applied to the vibrated member or the displacement of the vibrated member in the left-right direction, the first elastically deformable portion is located above the vibration portion in the up-down direction, the second elastically deformable portion is located above the vibration portion in the up-down direction, the third elastically deformable portion is located below the vibration portion in the up-down direction, the fourth elastically deformable portion is located below the vibration portion in the up-down direction, the first elastically deformable portion viewed in the up-down direction overlaps a left portion of the vibration portion viewed in the up-down direction as viewed in the front-rear direction, the second elastically deformable portion viewed in the up-down direction overlaps a right portion of the vibration portion viewed in the up-down direction as viewed in the front-rear direction, the third elastically deformable portion viewed in the up-down direction overlaps the left portion of the vibration portion viewed in the up-down direction as viewed in the front-rear direction, and the fourth elastically deformable portion viewed in the up-down direction overlaps the right portion of the vibration portion viewed in the up-down direction as viewed in the front-rear direction.

15. The electronic device according to claim 11, wherein the sensor includes a piezoelectric film.

16. The electronic device according to claim 15, wherein a principal surface of the piezoelectric film has a rectangular shape as viewed in the up-down direction.

17. The electronic device according to claim 15, wherein the piezoelectric film is a film having polylactic acid stretched at least in a uniaxial direction.

18. The electronic device according to claim 15, wherein the piezoelectric film has a piezoelectric constant of d14.

19. The electronic device according to claim 11, further comprising the vibrated member.

20. The electronic device according to claim 19, wherein the vibration device comprises:

a stopper having a fixed position in the up-down direction, and a conductive cushion member having conductivity, the conductive cushion member having an upper principal surface and a lower principal surface, a resistance value of the conductive cushion member changes with expansion and contraction thereof, the vibration portion has a first portion overlapping the vibrated member as viewed in the up-down direction, a first conductor pattern and a second conductor pattern are in a part of the first portion, the upper principal surface is in contact with each of the first conductor pattern and the second conductor pattern, the lower principal surface is in contact with the stopper, and the first conductor pattern is electrically connected to the second conductor pattern with the conductive cushion member interposed therebetween.

* * * * *